United States Patent [19]
Hiraiwa

[11] Patent Number: 4,660,439
[45] Date of Patent: Apr. 28, 1987

[54] PLANETARY GEAR TRAIN FOR AUTOMATIC TRANSMISSION
[75] Inventor: Kazuyoshi Hiraiwa, Atsugi, Japan
[73] Assignee: Nissan Motor Co., Ltd., Yokohama, Japan
[21] Appl. No.: 648,370
[22] Filed: Sep. 7, 1984
[30] Foreign Application Priority Data

| Sep. 8, 1983 | [JP] | Japan | 58-164209 |
| Sep. 16, 1983 | [JP] | Japan | 58-169324 |
| Sep. 20, 1983 | [JP] | Japan | 58-172219 |
| Oct. 20, 1983 | [JP] | Japan | 58-196733 |
| Oct. 20, 1983 | [JP] | Japan | 58-196735 |
| Oct. 20, 1983 | [JP] | Japan | 58-196736 |

[51] Int. Cl.$^4$ ............................................. F16H 57/10
[52] U.S. Cl. .................................. 74/763; 74/762; 74/766; 74/767
[58] Field of Search ............... 74/762, 763, 766, 767

[56] References Cited
U.S. PATENT DOCUMENTS

| 3,386,314 | 6/1968 | Stockton | 74/763 X |
| 3,483,771 | 12/1969 | Forster et al. | 74/763 X |
| 3,523,468 | 8/1970 | Kepner | 74/763 X |
| 3,701,293 | 10/1972 | Mori et al. | 74/763 X |
| 3,797,332 | 3/1974 | Cameron et al. | 74/763 |
| 3,877,320 | 4/1975 | Iijima | 74/763 X |
| 4,157,046 | 6/1979 | O'Malley | 74/763 |
| 4,237,749 | 12/1980 | Koivunen | 74/763 |
| 4,395,925 | 8/1983 | Gaus | 74/766 X |

FOREIGN PATENT DOCUMENTS

| 2013612 | 10/1971 | Fed. Rep. of Germany | 74/763 |
| 2053321 | 5/1972 | Fed. Rep. of Germany | 74/762 |

Primary Examiner—Leslie Braun
Assistant Examiner—Dwight G. Diehl
Attorney, Agent, or Firm—Schwartz, Jeffery, Schwaab, Mack, Blumenthal & Evans

[57] ABSTRACT

A planetary gear train for an automatic transmission comprises a basic planetary gearing, an output planetary gear set, and a change speed arrangement including clutches and brakes. One of a sun gear and a ring gear of the output planetary gear is constantly connected to an output member of the basic planetary gearing and the other is connectable via a clutch to a rotary element of the basic planetary gearing which is held stationary during operation with the first gear ratio or reverse. A pinion carrier of the output planetary gear set is constantly connected to an output shaft of the transmission.

16 Claims, 33 Drawing Figures

|  | C1 | C2 | B1 | B2 | B3 | GEAR RATIO | $\alpha_1 = \alpha_2 = \alpha_3$ $= 0.42$ |
|---|---|---|---|---|---|---|---|
| 1ST | ○ |  |  |  | ○ | $1 + 1/\alpha_3$ | 3.381 |
| 2ND | ○ |  |  | ○ |  | $1 + \alpha_2/\alpha_1 + \alpha_2$ | 2.420 |
| 3RD | ○ |  | ○ |  |  | $1 + \alpha_2$ | 1.420 |
| 4TH | ○ | ○ |  |  |  | 1 | 1.000 |
| REV. |  | ○ |  |  | ○ | $1 - \dfrac{1}{\alpha_2 \cdot \alpha_3}$ | −4.669 |

| | C 16 | C 18 | C 20 | B 22 | B 24 | GEAR RATIO | $\alpha_1 = \alpha_2 = \alpha_3 = 0.42$ |
|---|---|---|---|---|---|---|---|
| 1ST | | ○ | ○ | | ○ | $(1+\alpha_1+\alpha_1/\alpha_2)\cdot(1+\alpha_3)$ | 3.436 |
| 2ND | | ○ | | ○ | ○ | $(1+\alpha_1)\cdot(1+\alpha_3)$ | 2.016 |
| 3RD | ○ | ○ | | | ○ | $1+\alpha_3$ | 1.420 |
| 4TH | ○ | ○ | ○ | | | 1 | 1.000 |
| REV. | ○ | | ○ | | ○ | $-(1+\alpha_3)/\alpha_2$ | −3.381 |
| 2'ND | | ○ | ○ | ○ | ○ | $\dfrac{(1+\alpha_1)(1+\alpha_2)(1+\alpha_3)}{(1+\alpha_2+\alpha_3)}$ | 1.556 |

| | C 16 | C 18 | C 54 | C 56 | C 20 | B 22 | B 24 | GEAR RATIO | $\alpha_1 = 0.5$<br>$\alpha_2 = 0.4$<br>$\alpha_3 = 0.45$ |
|---|---|---|---|---|---|---|---|---|---|
| 1ST | | ○ | ○ | | ○ | | ○ | $(1 + \alpha_1 + \alpha_1/\alpha_2) \cdot (1 + \alpha_3)$ | 3.986 |
| 2ND | | ○ | ○ | | | ○ | ○ | $(1 + \alpha_1)(1 + \alpha_3)$ | 2.175 |
| 3RD | ○ | ○ | | | | | ○ | $1 + \alpha_3$ | 1.450 |
| 4TH | ○ | ○ | | ○ | ○ | | | $1$ | 1.000 |
| 5TH | ○ | | | ○ | ○ | ○ | | $(1 + \alpha_3)/(1 + \alpha_2 + \alpha_3)$ | 0.784 |
| REV. | ○ | | ○ | | ○ | | ○ | $-(1 + \alpha_3)/\alpha_2$ | −3.625 |
| 2'ND | | ○ | ○ | | ○ | ○ | ○ | $\dfrac{(1+\alpha_1)(1+\alpha_2)(1+\alpha_3)}{(1+\alpha_2+\alpha_3)}$ | 1.646 |
| 3'TH | ○ | ○ | | | ○ | ○ | | $\dfrac{(1+\alpha_2)(1+\alpha_3)}{(1+\alpha_2+\alpha_3)}$ | 1.097 |

FIG.6

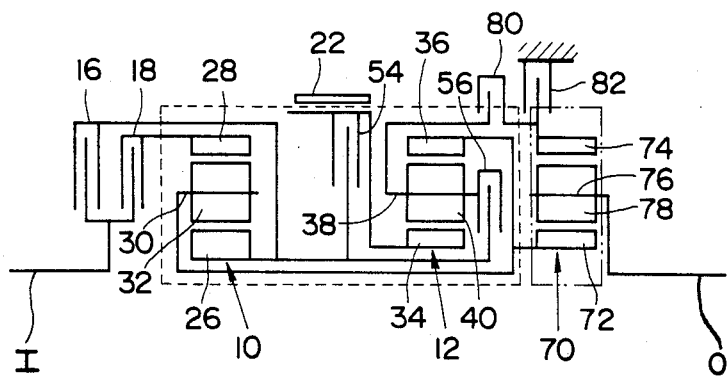

FIG.6A

| | C 16 | C 18 | C 54 | C 56 | C 80 | B 22 | B 82 | GEAR RATIO | $\alpha_1 = 0.45$<br>$\alpha_2 = 0.5$<br>$\alpha_3 = 0.6$ |
|---|---|---|---|---|---|---|---|---|---|
| 1ST | | ◯ | ◯ | | ◯ | | ◯ | $(1+\alpha_1+\alpha_1/\alpha_2)(\frac{1+\alpha_3}{\alpha_3})$ | 6.267 |
| 2ND | | ◯ | ◯ | | | ◯ | ◯ | $(1+\alpha_1)(\frac{1+\alpha_3}{\alpha_3})$ | 3.867 |
| 3RD | ◯ | ◯ | | | | | ◯ | $\frac{1+\alpha_3}{\alpha_3}$ | 2.667 |
| 4TH | | ◯ | ◯ | | ◯ | ◯ | | $\frac{(1+\alpha_1)(1+\alpha_2)(1+\alpha_3)}{1+\alpha_3(1+\alpha_2)}$ | 1.832 |
| 5TH | ◯ | ◯ | | | ◯ | ◯ | | $\frac{(1+\alpha_2)(1+\alpha_3)}{1+\alpha_3(1+\alpha_2)}$ | 1.263 |
| 6TH | ◯ | ◯ | | ◯ | ◯ | | | 1 | 1.000 |
| 7TH | ◯ | | | ◯ | ◯ | | | $\frac{1+\alpha_3}{1+\alpha_3(1+\alpha_2)}$ | 0.842 |
| REV. | ◯ | | ◯ | | ◯ | | ◯ | $-\frac{1+\alpha_3}{\alpha_2 \cdot \alpha_3}$ | -5.333 |

FIG.7

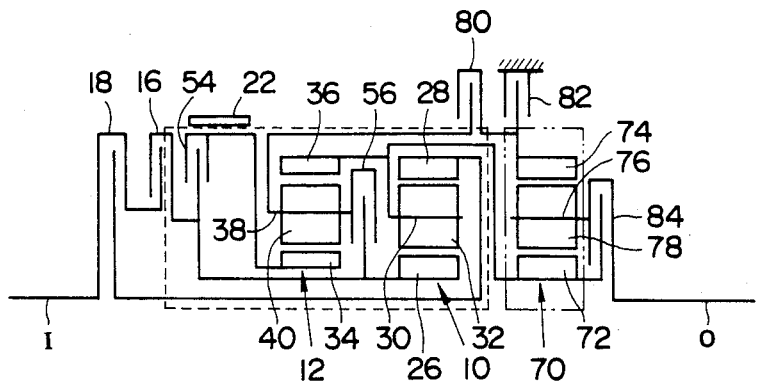

FIG.7A

| | C 16 | C 18 | C 54 | C 56 | C 80 | C 84 | B 22 | B 82 | GEAR RATIO | $\alpha_1 = 0.45$<br>$\alpha_2 = 0.5$<br>$\alpha_3 = 0.6$ |
|---|---|---|---|---|---|---|---|---|---|---|
| 1ST | | ○ | ○ | | ○ | | | ○ | $(1+\alpha_1+\alpha_1/\alpha_2)(\frac{1+\alpha_3}{\alpha_3})$ | 6.267 |
| 2ND | | ○ | ○ | | | | ○ | ○ | $(1+\alpha_1)(\frac{1+\alpha_3}{\alpha_3})$ | 3.867 |
| 3RD | ○ | ○ | | | | | | ○ | $\frac{1+\alpha_3}{\alpha_3}$ | 2.667 |
| 4TH | | ○ | ○ | | ○ | | ○ | | $\frac{(1+\alpha_1)(1+\alpha_2)(1+\alpha_3)}{1+\alpha_3(1+\alpha_2)}$ | 1.832 |
| 5TH | ○ | ○ | | | ○ | | ○ | | $\frac{(1+\alpha_2)(1+\alpha_3)}{1+\alpha_3(1+\alpha_2)}$ | 1.263 |
| 6TH | ○ | ○ | | ○ | ○ | | | | 1 | 1 |
| 7TH | ○ | | | ○ | ○ | | ○ | | $\frac{1+\alpha_3}{1+\alpha_3(1+\alpha_2)}$ | 0.842 |
| 8TH | ○ | | | ○ | | ○ | ○ | | $\frac{1}{1+\alpha_2}$ | 0.667 |
| REV. | ○ | | ○ | | ○ | | | ○ | $-\frac{1+\alpha_3}{\alpha_2 \cdot \alpha_3}$ | −5.333 |

|  | C 104 | C 106 | C 108 | B 110 | B 112 | GEAR RATIO | $\alpha_1 = 0.45$<br>$\alpha_2 = 0.45$<br>$\alpha_3 = 0.4$ |
|---|---|---|---|---|---|---|---|
| 1ST | ○ |  | ○ | ○ |  | $(1+\alpha_1)/\alpha_3$ | 3.625 |
| 2ND | ○ |  |  | ○ | ○ | $\dfrac{(\alpha_2+\alpha_3)(1+\alpha_1)}{\alpha_3 \cdot (1+\alpha_2)}$ | 2.125 |
| 3RD | ○ | ○ |  | ○ |  | $1+\alpha_1$ | 1.450 |
| 4TH | ○ | ○ | ○ |  |  | 1 | 1.000 |
| REV. |  | ○ | ○ | ○ |  | $-(1+\alpha_1)/\alpha_2$ | -3.222 |

| | C 104 | C 106 | C 108 | C 136 | B 110 | B 112 | GEAR RATIO | $\alpha_1 = 0.45$ $\alpha_2 = 0.45$ $\alpha_3 = 0.40$ |
|---|---|---|---|---|---|---|---|---|
| 1ST | ○ | | ○ | | ○ | | $(1+\alpha_1)/\alpha_3$ | 3.625 |
| 2ND | ○ | | | | ○ | ○ | $\dfrac{(\alpha_2+\alpha_3)(1+\alpha_1)}{\alpha_3 \cdot (1+\alpha_2)}$ | 2.125 |
| 3RD | ○ | | | ○ | ○ | | $1+\alpha_1$ | 1.450 |
| 4TH | ○ | | ○ | ○ | | | 1 | 1.000 |
| 5TH | | | ○ | ○ | | ○ | $(1+\alpha_1)/(1+\alpha_1+\alpha_2)$ | 0.763 |
| REV. | | ○ | ○ | | ○ | | $-(1+\alpha_1)/\alpha_2$ | −3.222 |

FIG. 15A

| | | C 156 | C 158 | C 160 | C 162 | B 164 | B 166 | O/C 192 | O/C 194 | O/C 196 | GEAR RATIO | $P_1 = 0.4$<br>$P_2 = 0.6$<br>$P_3 = 0.4$ |
|---|---|---|---|---|---|---|---|---|---|---|---|---|
| AUTOMATIC DRIVE RANGE (D-RANGE) | 1ST | | | ○ | | | | | | ○ | $\left(\dfrac{1+P_2}{P_2}\right)(1+P_3)$ | 3.733 |
| | 2ND | | | ○ | | ○ | | | ○ | | $\dfrac{P_1+P_2(1+P_1)}{P_2(1+P_1)}(1+P_3)$ | 2.067 |
| | 3RD | | ○ | | ○ | | | | | ○ | $1+P_3$ | 1.4 |
| | 4TH | | ○ | | ○ | | | ○ | | | $1$ | 1 |
| | 5TH | | ○ | | ○ | | | ○ | | | $\dfrac{1+P_3}{1+P_1+P_3}$ | 0.778 |
| REV. | | ○ | | | | | ○ | | | | $-\dfrac{1+P_3}{P_1}$ | −3.5 |
| ENGINE BRAKING | 1ST | | | ○ | | | ○ | | | | | |
| | 2ND | | | ○ | ○ | | ○ | | | | | |
| | 3RD | | ○ | | ○ | | ○ | | | | | |
| | 4TH | ○ | ○ | | | ○ | | | | | | |
| 2'TH | | | | ○ | ○ | ○ | | | | | $\dfrac{(P_1+P_2+P_1P_2)(1+P_3)}{P_2(1+P_1+P_3)}$ | 1.607 |

FIG.17A

| | | C 156 | C 158 | C 200 | C 160 | C 162 | B 164 | B 166 | O/C 202 | O/C 196 |
|---|---|---|---|---|---|---|---|---|---|---|
| AUTOMATIC DRIVE RANGE | 1ST | | | ○ | | | | | ○ | ○ |
| | 2ND | | | ○ | | | ○ | | ○ | |
| | 3RD | | ○ | ○ | | | | | ○ | |
| | 4TH | | ○ | ○ | | ○ | | | ○ | |
| | 5TH | | ○ | (○) | | ○ | ○ | | | |
| REV. | | ○ | | | | ○ | | ○ | | |

FIG. 19A

| | C 216 | C 222 | C 220 | C 218 | C 220 | B 226 | B 228 | O/C 256 | O/C 258 | O/C 260 | GEAR RATIO | $P_1 = 0.58$<br>$P_2 = 0.42$<br>$P_3 = 0.42$ |
|---|---|---|---|---|---|---|---|---|---|---|---|---|
| AUTOMATIC DRIVE RANGE 1ST | | | ○ | | | | | ○ | ○ | ○ | $(\frac{1+P_1}{P_1})(1+P_3)$ | 3.868 |
| 2ND | | ○ | | | | ○ | | ○ | | ○ | $\frac{P_2 + P_1(1+P_2)}{P_1(1+P_2)} \cdot (1+P_3)$ | 2.144 |
| 3RD | | ○ | | | ○ | | | ○ | | ○ | $1+P_3$ | 1.420 |
| 4TH | | ○ | | | ○ | | | ○ | | | $1$ | 1.000 |
| 5TH | | | (○) | ○ | ○ | | | | | | $\frac{1+P_3}{1+P_2+P_3}$ | 0.772 |
| REV. | ○ | | | | | | ○ | | | | $-\frac{1+P_3}{P_2}$ | -3.381 |
| ENGINE BRAKING 1ST | ○ | | | | | | ○ | | | | | |
| 2ND | ○ | | | | ○ | | ○ | | | | | |
| 3RD | | ○ | | | ○ | ○ | | | | | | |
| 4TH | | | ○ | | | ○ | | ○ | | | | |
| 2'TH | ○ | | ○ | | | ○ | | | | | $\frac{(P_1+P_2+P_1P_2)(1+P_3)}{P_1(1+P_2+P_3)}$ | 1.745 |

FIG. 20A

| | | C 216 | C 222 | C 224 | C 218 | B 226 | B 228 | O/C 270 | O/C 258 | O/C 260 |
|---|---|---|---|---|---|---|---|---|---|---|
| AUTOMATIC DRIVE RANGE | 1ST | ○ | | | | | | | ○ | ○ |
| | 2ND | ○ | | | | ○ | | | | ○ |
| | 3RD | | ○ | | | | | ○ | | ○ |
| | 4TH | | ○ | ○ | | | | ○ | | |
| | 5TH | | ○ | ○ | | ○ | | | | |
| REV. | | | | ○ | ○ | | ○ | | | |
| ENGINE BRAKING | 1ST | ○ | | | ○ | | ○ | | | |
| | 2ND | ○ | | | | ○ | ○ | | | |
| | 3RD | ○ | ○ | | | | ○ | | | |
| | 4TH | ○ | ○ | ○ | | | | | | |
| 2'TH | | ○ | | ○ | | ○ | | | | |

FIG. 21A

| | C 286 | C 288 | C 290 | C 292 | C 294 | B 296 | B 298 | O/C 324 | O/C 326 | O/C 328 | GEAR RATIO | $P_1 = 0.55$<br>$P_2 = 0.44$<br>$P_3 = 0.47$ |
|---|---|---|---|---|---|---|---|---|---|---|---|---|
| AUTOMATIC DRIVE RANGE — 1ST | ○ | | | | | | | ○ | ○ | ○ | $(1+\frac{1}{P_1})(1+P_3)$ | 4.143 |
| 2ND | ○ | | | | | ○ | | ○ | ○ | | $\frac{P_2+P_1(1+P_2)}{P_1(1+P_2)} \cdot (1+P_3)$ | 2.287 |
| 3RD | ○ | | ○ | | ○ | | | ○ | | ○ | $1+P_3$ | 1.470 |
| 4TH | ○ | | ○ | | ○ | | | | | | $1$ | 1.000 |
| 5TH | (○) | | ○ | | ○ | ○ | | | | | $\frac{1+P_3}{1+P_2+P_3}$ | 0.770 |
| REV. | | ○ | | | | | | | | | $-\frac{1+P_3}{P_2}$ | -3.341 |
| ENGINE BRAKING — 1ST | ○ | | | ○ | | | ○ | | | | | |
| 2ND | ○ | | | ○ | ○ | ○ | ○ | | | | | |
| 3RD | ○ | | ○ | ○ | ○ | | ○ | | | | | |
| 4TH | ○ | | ○ | ○ | ○ | | ○ | | | | | |
| 2'TH | ○ | | | ○ | ○ | ○ | | ○ | | | $\frac{(P_1+P_2+P_1P_2)(1+P_3)}{P_1(1+P_2+P_3)}$ | 1.724 | ized box, while an output planetary gear set en-

PLANETARY GEAR TRAIN FOR AUTOMATIC TRANSMISSION

BACKGROUND OF THE INVENTION

The present invention relates to a planetary gear train for an automatic transmission.

A representative example of a conventional planetary gear train for a four speed automatic transmission incorporating three planetary gear sets is one for an automatic transmission of AT540 type manufactured by General Motors in the U.S., which is shown in FIG. 1. The planetary gear train of for this automatic transmission comprises three planetary gear sets G1, G2 and G3 wherein sun gears S1, S2 and S3, ring gears R1, R2 and R3, and pinion carriers PC1, PC2 and PC3 are connected to an input shaft I, an output shaft O, two clutches C1 and C2, and three brakes B1, B2 and B3 as shown in FIG. 1. This conventional planetary gear train provides four forward speed ratios and one reverse speed ratio which have gear ratios as shown in FIG. 1A by actuating a selected combination of the clutches C1 and C2 and brakes B1, B2 and B3 as shown in FIG. 1A.

This planetary gear train, however, poses a problem as follows: That is, the gear ratio for the reverse speed is too large as compared to the gear ratio for the first forward speed. If, for example, a ratio ($\alpha$1) of the number of teeth of the sun gear to the number of teeth of the ring gear in the planetary gear set G1, a ratio ($\alpha$2) of the number of the teeth of the sun gear to the number of teeth of the ring gear in the planetary gear set G2 and a ratio ($\alpha$3) of the number of teeth of the sun gear to the number of teeth of the ring gear in the planetary gear set G3 are equal to 0.42, the gear ratio for the first forward speed results in 3.381 and the gear ratio for the reverse results in $-4.669$. Thus, it is necessary to increase the strength of each of the rotary power transmitting elements such as gears, shafts and the like to withstand a large torque during the reverse drive. This means that large-sized torque transmitting component parts have to be used, resulting in an increase in size of a transmission. Increasing the strength of the overall transmission to withstand a large torque produced during the reverse drive which is less frequently used as compared to the forward speeds is not a good measure in terms of cost.

SUMMARY OF THE INVENTION

An object of the present invention is to provide a planetary gear train where the difference in magnitude between a gear ratio for the reverse and a gear ratio for the first forward speed is small.

According to the present invention, a planetary gear train for an automatic transmission comprises: a basic planetary gearing and an output planetary gear set. The basic planetary gearing includes a first rotary element which is to be held stationary when the first gear ratio and also when the reverse is established and a second rotary element adapted to serve as a power output member thereof, whereas the output planetary gear set includes a ring gear, a sun gear and a pinion carrier. One of the ring gears and the sun gear of the output planetary gear set is constantly connected to the second rotary element of the basic planetary gearing and the other one thereof is connectable via a clutch to the first rotary element of the basic planetary gearing and is adapted to be anchored by a brake. The pinion carrier of the output planetary gear set is constantly connected to an output shaft.

BRIEF DESCRIPTION OF THE DRAWINGS

FIGS. 2 to 21 are schematic diagrams showing various embodiments of a planetary gear train for an automatic transmission according to the present invention, respectively; and FIGS. 2A, 4A, 6A, 7A, 10A, 12A, 15A, 17A, 19A, 20A, and 21A are tables showing the operating sequence of clutches, brakes and/or one-way clutches of the corresponding planetary gear trains, respectively.

GENERAL DESCRIPTION OF THE EMBODIMENTS

To facilitate understanding of and comparison between the embodiments illustrated in FIGS. 2 to 21, a basic planetary gearing is enclosed by a broken line illustrated box, while an output planetary gear set enclosed by an imaginary line illustrated box.

DETAILED DESCRIPTION OF THE PREFERRED EMBODIMENTS

Figures 1, 1A:
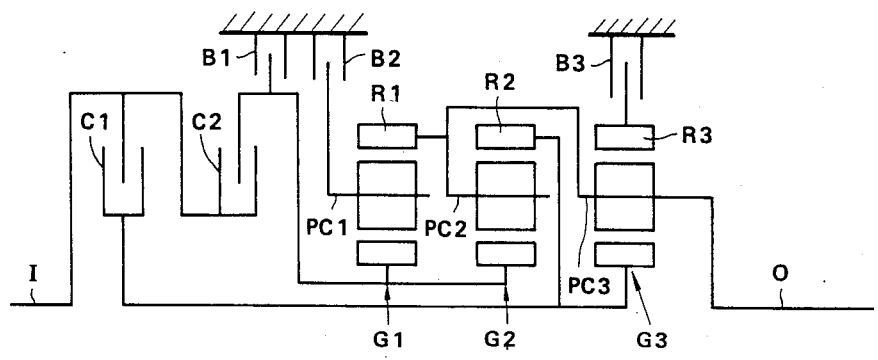
FIG. 1 is a schematic diagram showing a conventional planetary gear train discussed above.
FIG. 1A is a table showing the operating sequence of clutches and brakes in the conventional gear train shown in FIG. 1.
Figures 2, 2A:
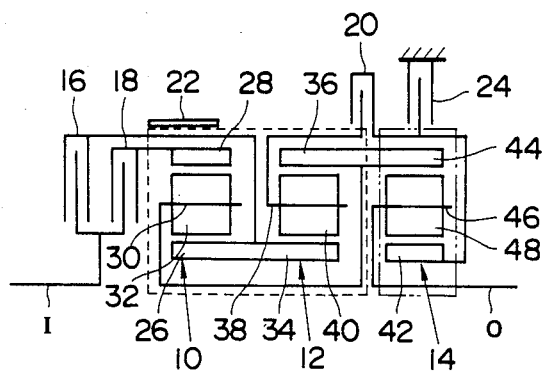

FIG. 2 shows a first embodiment of a planetary gear train for an automatic transmission according to the present invention. The planetary gear train comprises an input shaft I, an output shaft O, a basic planetary gearing including two simple planetary gear sets 10 and 12, an output planetary gear set in the form of a simple planetary gear set 14, and a change speed arrangement including three clutches 16, 18, 20, and two brakes 22, 24.

Planetary gear set 10 comprises a first sun gear 26, a first ring gear 28, a pinion carrier 30 (i.e., a rotary element which serves as an output member of the basic planetary gearing of this particular embodiment) rotatably supporting a plurality of first pinions 32, each meshing both with the sun gear 26 and ring gear 28.

Planetary gear set 12 comprises a second sun gear 34 constantly connected to the first sun gear 26, a second ring gear constantly connected to the first pinion carrier 30, and a second pinion carrier 38 (i.e., a rotary element which is to be held stationary when the first gear ratio and also when the reverse is established) rotatably supporting a plurality of second pinions 40 each meshing both with the sun gear 34 and ring gear 36.

Output planetary gear set 14 comprises a sun gear 14 connectable via the clutch 20 to the second pinion carrier 38, a ring gear 44 constantly connected to the ring gear 36 and the pinion carrier 30 to receive output from the basic planetary gearing, and a pinion carrier 46 rotatably supporting a plurality of pinions 48, each meshing both with the sun gear 42 and ring gear 44. The sun gear 42 is adapted to be braked or anchored by the brake 24. The pinion carrier 46 of the output planetary gear set 14 is constantly connected to the output shaft O.

The clutch 16 is operable to establish a connection between the input shaft I and the interconnected or common sun gears 26 and 34, while the clutch 18 is operable to establish a connection between the input shaft I and the ring gear 28. The brake 22 is operable to anchor the sun gears 26 and 34.

The operating sequence of clutches 16, 18, 20 and brakes 22, 24 is tabulated in FIG. 2A where legend o denotes the engagement of a particular clutch or application of a particular brake. Gear ratio is calculated on the assumption that alpha 1 ($\alpha 1$), alpha 2 ($\alpha 2$) and alpha 3 ($\alpha 3$) are equal to 0.42, where alpha 1, alpha 2 and alpha 3 denote a ratio of number of teeth of a sun gear to that of a ring gear in the planetary gear sets 10, 12 and 14, respectively.

It will be appreciated from FIG. 2A that although the gear ratio for the first speed which is 3.436 is slightly larger in magnitude than the gear ratio for the reverse which is −3.381, the difference therebetween is very small. Therefore, various torque transmitting component parts can be made compact with minimal necessary strength because the strength of the component parts, such as gears and shafts, are usually set based on the requirements for operation with the first gear ratio. This makes a great contribution to reducing the overall size of the transmission.

In this embodiment, the three planetary gear sets with the same gear geometry are used so that a great manufacturing advantage and a considerable cost reduction are given. As will be understood from FIG. 2A, gear ratios for the second and third speeds are also suitable for an automotive automatic transmission. It will also be noted that by actuating the clutches 18, 20 and brakes 22, 24, another speed (2'nd speed) having a gear ratio 1.556 may be produced in addition to four forward speeds. Thus, if necessary, the planetary gear train in this embodiment can provide five forward speeds.

Figure 3:
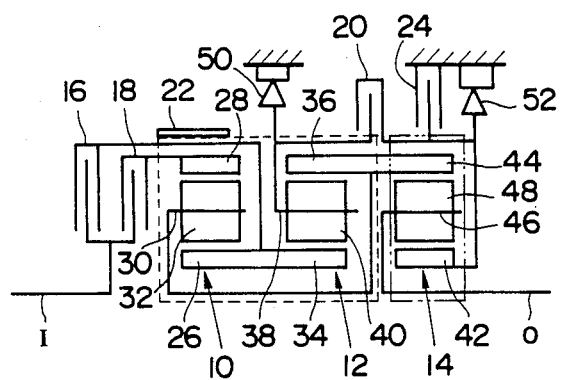

Referring to FIG. 3, a second embodiment is described. This embodiment is substantially the same as the first embodiment shown in FIGS. 2 and 2A except the provision of two one-way clutches 50 and 52 which are operable to prevent rotation of the associated rotary element in one of two rotational directions. The one-way clutch 52 is operable to prevent reverse rotation of a sun gear 42 of an output planetary gear set 14, whereas the one-way clutch 50 is operable to prevent reverse rotation of a pinion carrier 38 (which is adapted to be held stationary when the first speed or the reverse is established). Therefore, in the case where the one-way clutches 52 and 50 are put into operation, it is not necessary to actuate a brake 24 and a clutch 20, making it easy to adjust timing during shifting. Describing further in connection with FIG. 2A, engagement of a clutch 20 and application of a brake 24 are not necessary owing to the operation of the one-way clutches 50 and 52 when the first gear ratio is to be established and application of brake 24 during operation with second and third gear ratios is not necessary. This means that shiftings among forward speeds are considerably simplified. Thus, a hydraulic control system to be operatively connected with the planetary gear train can be simplified. Although in this second embodiment two one-way clutches 50 and 52 are used, only one of them may be taken away as the case may be.

Figure 4:
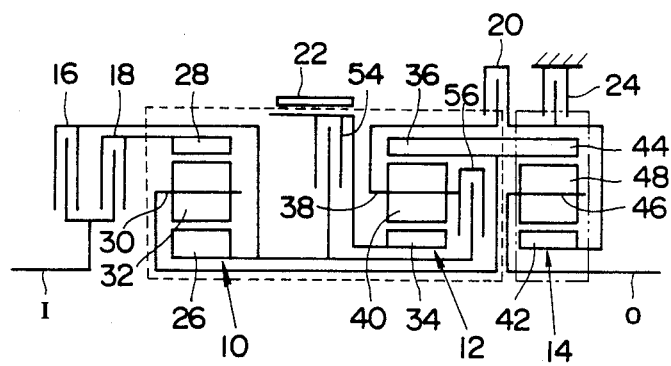
Figures 4A, 5:
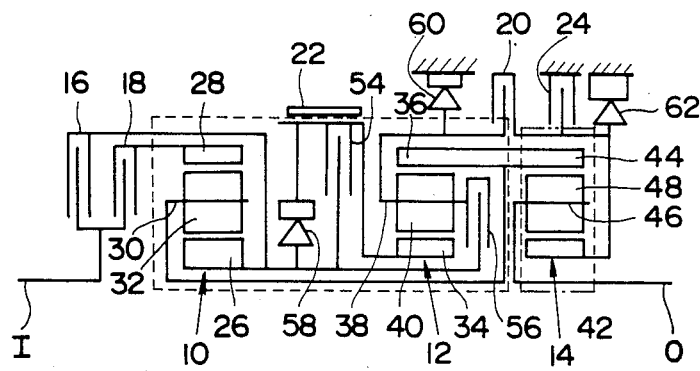

Referring to FIGS. 4 and 4A, a third embodiment is described. This third embodiment is intended to provide a planetary gear train having an overdrive. This third embodiment is substantially similar to the first embodiment shown in FIGS. 2 and 2A except that in this third embodiment, sun gears 26 and 34 are not constantly connected but connectable to each other via a clutch 54, the sun gear 26 is connectable via another clutch 56 to a pinion carrier 38 of a second planetary gear set 12 and a brake 22 is operable to anchor the sun gear 34.

The operating sequence of five clutches 16, 18, 54, 56, 20 and two brakes 22, 24 is tabulated in FIG. 4A. Gear ratio is calculated on the assumption that alpha 1 ($\alpha 1$) is equal to 0.5, alpha 2 ($\alpha 2$) is equal to 0.4 and alpha 3 ($\alpha 3$) is equal to 0.45 where alpha 1, alpha 2 and alpha 3 denote a ratio of number of teeth of a sun gear to that of a ring gear in the three planetary gear sets 10, 12 and 14 of the particular embodiment, respectively.

As will be understood from FIG. 4A, the gear ratio for the first speed is slightly larger, in magnitude, than that for the reverse with a small difference, and the gear ratios for the other speeds are suitable for an automotive automatic transmission. If desired, this planetary gear train can provide six or seven forward speeds by providing additional one and/or two speeds which are obtained by actuating the clutches and brakes as tabulated in the bottom two rows.

Referring to FIG. 5, a fourth embodiment is described. This embodiment is substantially the same as the third embodiment shown in FIGS. 4 and 4A except the provision of three one-way clutches 58, 60 and 62 which are operable to prevent rotation of the associated rotary element in one of two rotational directions. The one-way clutch 62 is operable to prevent reverse rotation of a sun gear 42 of an output planetary gear set, the one-way clutch 60 is operable to prevent reverse rotation of a pinion carrier 38 of a second planetary gear set of a basic planetary gearing, and the one-way clutch 58 is drivingly connected between sun gears 26 and 34. Owing to the provision of the one-way clutches 58, 60 and 62, adjustment of shift timing has been made easy, resulting in simplification of a hydraulic control system. Although, in this embodiment, three one-way clutches 58, 60 and 62 are used, any one or two of them may be taken away as the case may be.

Referring to FIGS. 6 and 6A, a fifth embodiment is described. This fifth embodiment is similar to the third embodiment in that both use substantially the same basic planetary gearing. However, this fifth embodiment is quite different from the third embodiment (see FIG. 4) in a manner of connecting an output planetary gear set to the basic planetary gearing.

As shown in FIG. 6, in the fifth embodiment, the output planetary gear set which is now denoted by 70 comprises a sun gear 72 constantly connected to a ring gear 36 and a sun gear 26 which serve as an output member of the basic planetary gearing, a ring gear 74 connectable via a clutch 80 to a pinion carrier which is to be held stationary when first gear ratio and also when reverse is established, and a pinion carrier 76 rotatably supporting a plurality of pinions 78, each meshing both with the sun gear 72 and the ring gear 74. The ring gear 74 is adapted to be braked or anchored by a brake 82. The pinion carrier 76 is constantly connected to an output shaft O.

The operating sequence of five clutches 16, 18, 54, 56, 80 and two brakes 22, 82 is tabulated in FIG. 6A. Gear ratio is calculated on the assumption that alpha 1 ($\alpha 1$) is equal to 0.45, alpha 2 ($\alpha 2$) is equal to 0.5 and alpha 3 ($\alpha 3$) is equal to 0.6, where alpha 1, alpha 2 and alpha 3 denote a ratio of number of teeth of a sun gear to that of a ring gear in the three planetary gear sets 10, 12 and 70, respectively.

As will be noted from FIG. 6A, the difference in magnitude between gear ratio (6.267) for the first speed and the gear ratio (−5.333) for the reverse is very small, the gear ratio in each of speed ratios is suitable for an automotive automatic transmission and seven forward speeds including an overdrive seventh speed are obtained by selectively actuating the clutches and brakes as shown in FIG. 6A. With this planetary gear train shown in FIG. 6, therefore, an automotive automatic transmission without a torque converter can be constructed.

Referring to FIGS. 7 and 7A, a sixth embodiment is described. This sixth embodiment is substantially the same as the fifth embodiment shown in FIGS. 6 and 6A, but different from the latter in the arrangement of first and second planetary gear sets 10 and 12 of a basic planetary gear train and clutches 16, 18, 54 and 56. Another difference resides in the provision of a sixth clutch 84.

As shown in FIG. 7, the first planetary gear set 10 is disposed between the second planetary gear set 12 and an output planetary gear set 70 with the clutch 56 interposed therebetween. The clutch 16 is disposed rearwardly of the clutch 16 and the clutch 54 is disposed between the clutch 16 and the second planetary gear set 12. In other words, the clutch 54 which was disposed between the first and second planetary gear sets 10 and 12 in the fifth embodiment shown in FIG. 6 has been moved forwardly of the planetary gear sets 10 and 12. The newly added sixth clutch 84 is operable to establish a connection between a sun gear 72 and a ring gear 74 of an output planetary gear set 70 to lock same. This clutch 84 is engaged when the eighth speed is to be established as will be readily understood from FIG. 7A.

Figure 8:
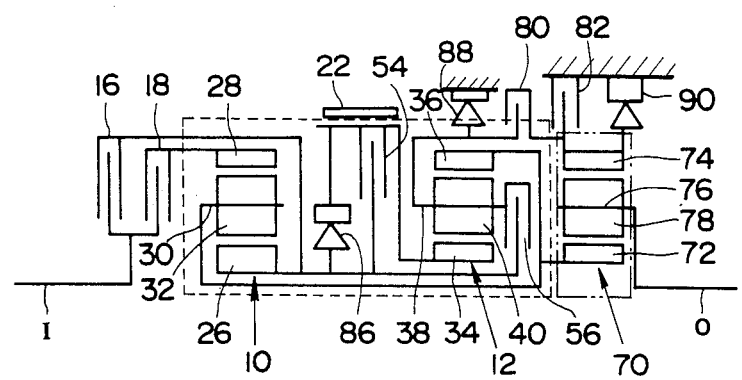

Referring to FIG. 8, a seventh embodiment is described. This seventh embodiment is substantially the same as the fifth embodiment shown in FIGS. 6 and 6A except the provision of three one-way clutches 86, 88 and 90. The one-way clutch 90 is operable to prevent reverse rotation of a ring gear 74 of an output planetary gear set 70, the one-way clutch 88 is operable to prevent reverse rotation of a pinion carrier 38, and the one-way clutch 86 is drivingly connected between sun gears 26 and 34. Although in this seventh embodiment, three one-way clutches 86, 88 and 90 are used, any one or two of them may be taken away as the case may be.

Figure 9:
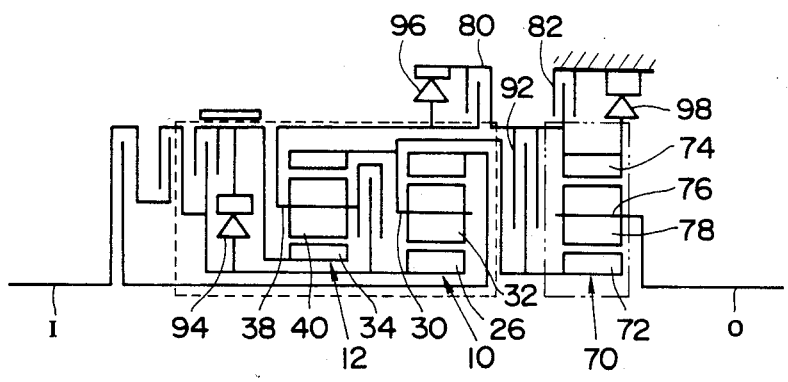

Referring to FIG. 9, an eighth embodiment is described. This eighth embodiment is substantially the same as the sixth embodiment shown in FIGS. 7 and 7A except the provision of a sixth clutch 92 in lieu of the sixth clutch 84 (see FIG. 7) and the provision of three one-way clutches 86, 88 and 90. The clutch 92 is operable to establish a connection between a ring gear 74 and a sun gear 72 of an output planetary gear set 70, thus locking the output planetary gear set 70 upon engagement thereof. Similarly to the clutch 84 of the sixth embodiment shown in FIG. 7, the clutch 92 of this eighth embodiment is engaged when the eighth speed is to be established. This clutch 92 is advantageous over the clutch 84 (see FIG. 7) in that required capacity for the clutch 92 is smaller than that for the clutch 84. Describing the one-way clutches 94, 96 and 98, the one-way clutch 98 is operable to prevent reverse rotation of a ring gear 74 of an output planetary gear set 70, the one-way clutch 96 is operable to prevent reverse rotation of a pinion carrier 38, and the one-way clutch 94 is drivingly connected between sun gears 26 and 34. Although, in this eighth embodiment, the one-way clutch 96 is connected between the ring gear 74 and the pinion carrier 38, it can prevent reverse rotation of the pinion carrier 38 like the one-way clutch 88 shown in FIG. 8 because the one-way clutch 98 prevents reverse rotation of the ring gear 74.

Figures 10, 10A:
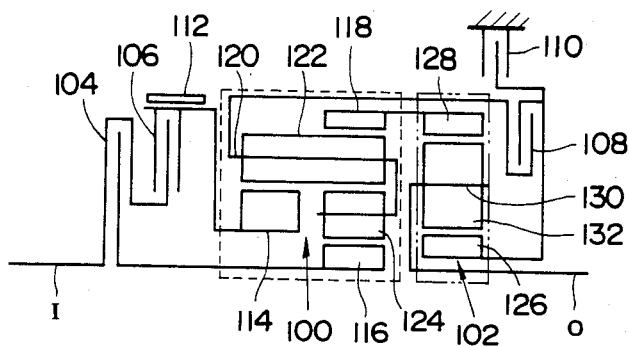

Referring to FIGS. 10 and 10A, a ninth embodiment is described. In this ninth embodiment, a planetary gear train comprises a basic planetary gearing in the form of a dual-intermeshed pinion planetary gear set 100 and an output planetary gear set 102 which is connected to the dual-intermeshed pinion planetary gear set 100 in a similar manner as the first embodiment (see FIG. 2). It also comprises three clutches 104, 106, and 108 and two brakes 110 and 112. The dual-intermeshed pinion planetary gear set 100 comprises two sun gears 114 and 116, a ring gear 118 which is a rotary element serving as an output member of the basic planetary gearing, and a pinion carrier 120 which is a rotary element adapted to be held stationary when the first speed or reverse is to be established. The pinion carrier 120 rotatably supports a plurality of outer pinions 122 each meshing with the ring gear 118 and also with the sun gear 114, and a corresponding number of inner pinions 124, each meshing with the corresponding outer pinion 122 and the sun gear 116. The output planetary gear set 102 includes a sun gear 126, a ring gear 128 and a pinion carrier 132 rotatably supporting a plurality of pinions 132, each meshing with the ring gear 128 and sun gear 126. The sun gear 126 is connectable via the clutch 108 to the pinion carrier 120 and is adapted to be anchored by the brake 110, the ring gear 128 is constantly connected to the ring gear 118, and the pinion carrier 130 is constantly connected to an output shaft O.

The clutch 104 is operable to establish a connection between an input shaft I and the sun gear 116, while the clutch 106 is operable to establish a connection between the input shaft I and the sun gear 114. The brake 102 is operable to anchor the sun gear 114.

The operating sequence of the three clutches 104, 106, 108 and two brakes 110, 112 is tabulated in FIG. 10A on the assumption that alpha 1 ($\alpha 1$) is equal to 0.45, alpha 2 ($\alpha 2$) is equal to 0.45 and alpha 3 ($\alpha 3$) is equal to 0.4, where alpha 1 denote a ratio of number of teeth of the sun gear 126 to that of the ring gear 128 in the output planetary gear set 102, alpha 2 denotes a ratio of number of teeth of the sun gear 114 to that of the ring gear 118 and alpha 3 denotes a ratio of number of teeth of the sun gear 116 to that of the ring gear 118.

Figure 11:
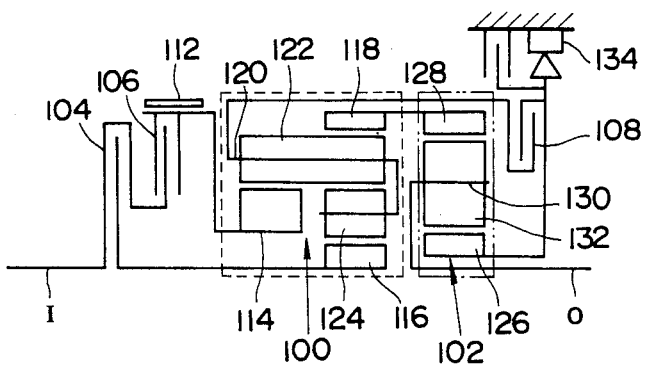

Referring to FIG. 11, a tenth embodiment is described. This tenth embodiment is substantially the same as the ninth embodiment shown in FIGS. 10 and 10A except the provision of a one-way clutch 134 which is operable to prevent reverse rotation of a sun gear 126 of an output planetary gear set 102. With this one-way clutch 134, it is no more necessary to actuate a brake 134 during automatic drive range, making it easy to adjust shift timings, thus contributing to simplification of a hydraulic control system.

Figures 12, 12A:
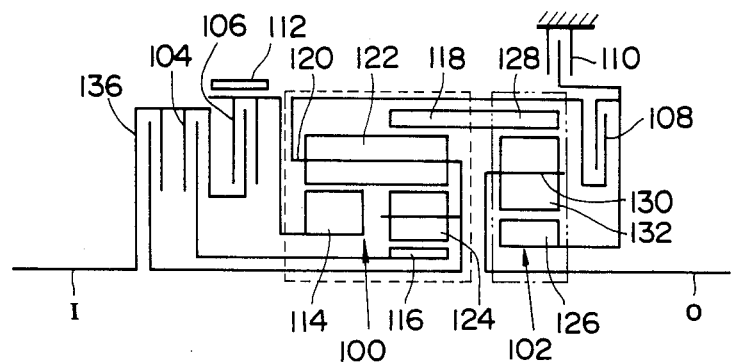

Referring to FIGS. 12 and 12A, an eleventh embodiment is described. This eleventh embodiment is substantially the same as the ninth embodiment shown in FIGS. 10 and 10A except the provision of a fourth clutch 136 for the purpose of providing a fifth overdrive speed. This clutch 136 is operable to establish a connection between an input shaft I and a pinion carrier 120 of a dual-intermeshed pinion planetary gear set 100. The operating sequence of four clutches 104, 106, 108, 136 and two brakes 110, 112 is tabulated in FIG. 12A.

Figure 13:
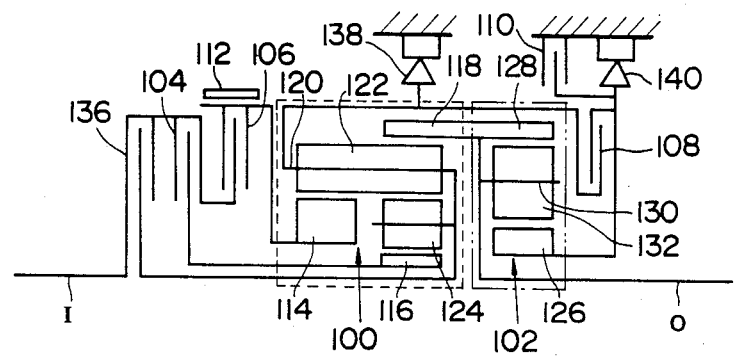

Referring to FIG. 13, a twelfth embodiment is described. This embodiment is substantially the same as the eleventh embodiment shown in FIG. 12 except the provision of two one-way clutches 138 and 140. The one-way clutch 140 is operable to prevent reverse rotation of a sun gear 126 of an output planetary gear set 102, while the one-way clutch 138 is operable to prevent reverse rotation of a pinion carrier 120 of a dual-intermeshed pinion planetary gear set 100. With the one-way clutch 140, it is no longer necessary to actuate a brake 110 during shifting in automatic drive range, and with the one-way clutch 138, it is no longer necessary to actuate a clutch 108 for shfting in the automatic drive range. Therefore, it can be made easy to adjust shift timing, thus contributing to the simplification of a hydraulic control system.

Figure 14:
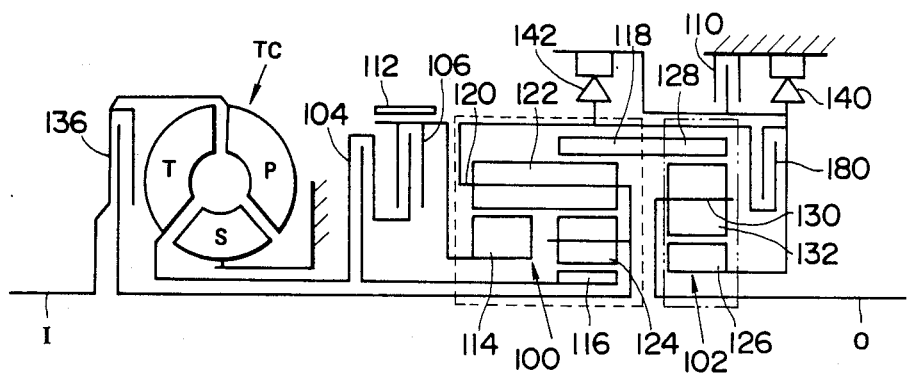

Referring to FIG. 14, a thirteenth embodiment is described. This embodiment is substantially the same as the twelfth embodiment shown in FIG. 13 except for the provision of a torque converter TC including a pump impeller P constantly connected to an input shaft I, a turbine runner T and a stator S, and the provision of a one-way clutch 142 drivingly connected between a one-way clutch 140 and a pinion carrier 120 instead of the one-way clutch 138 of the twelfth embodiment shown in FIG. 13. As shown in FIG. 14, the torque converter TC is disposed between a clutch 136 and a clutch 104. The clutch 104 is operable to establish a connection between the turbine T and a sun gear 116 of a dual-intermeshed pinion planetary gear set 100. As different from the clutch 138 used in the embodiment shown in FIG. 13, the clutch 142 of this embodiment is connected between the one-way clutch 140 in parallel to a clutch 108. However, the function is the same. In this embodiment, a split drive path through the torque converter TC is established during operation with the third speed or the fourth speed where the clutches 104 and 136 are both engaged. In the fifth overdrive where the clutches 108 and 136 are engaged and a brake 112 is applied, a mechanical toque path bypassing the torque converter TC is established, thus providing high torque transmission effeciency.

Figure 15:
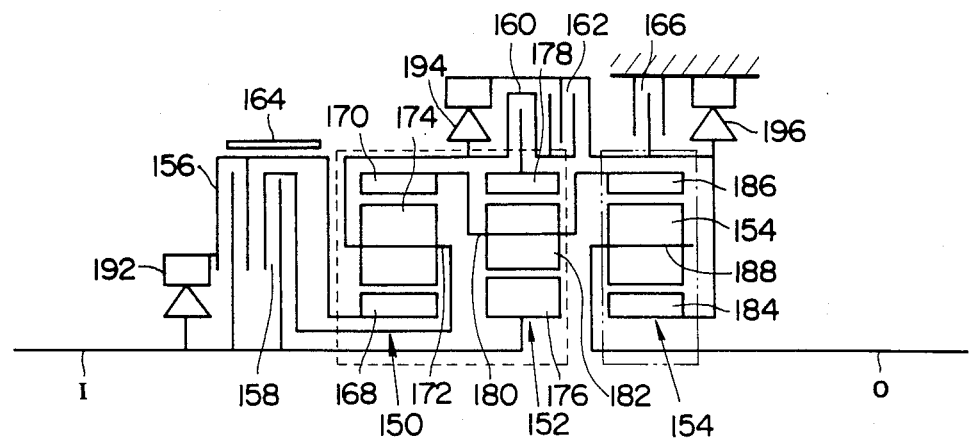

Referring to FIGS. 15 and 15A, a fourteenth embodiment is described. In this fourteenth embodiment, a planetary gear train comprises an input shaft I, an output shaft O, a basic planetary gearing including two simple planetary gear sets 150 and 152, an output planetary gear set 154, and a change speed arrangement including four clutches 156, 158, 160, 162, two brakes 164, 166 and three one-way clutches 192, 194, 196.

Planetary gear set 150 comprises a first sun gear 168, a first ring gear 170, and a first pinion carrier 172 (i.e., a rotary element which serves as an output member of the basic planetary gearing of this particular embodiment) rotatably supporting a plurality of first pinions 174, each meshing with the sun gear 168 and the ring gear 170.

Planetary gear set 152 comprises a second sun gear 176 constantly connected to the input shaft 1, a second ring gear 178, and a second pinion carrier 180 (i.e., a rotary element which is to be held stationary when the first gear ratio and also when the reverse is established) constantly connected to the first ring gear 170. The pinion carrier 180 rotatably supports a plurality of pinions 182, each meshing both with the sun gear 176 and the ring gear 178.

Output planetary gear set 154 comprises a sun gear 184 connectable via the clutch 162 to the pinion carrier 172, a ring gear 186 constantly connected to the pinion carrier 180 to receive output from the basic planetary gearing, and a pinion carrier 188 rotatably supporting a plurality of pinions 154, each meshing with the sun gear 184 and the ring gear 186. The sun gear 184 is adapted to be braked or anchored by the brake 166. The pinion carrier of the output planetary gear set 154 is constantly connected to the output shaft O.

The clutch 156 is operable to establish a connection between the input shaft I and the sun gear 168, the clutch 158 is operable to establish a connection between the input shaft I and the pinion carrier 172, and the clutch 160 is operable to establish a connection between the ring gear 178 and the pinion carrier 172. The brake 164 is operable to anchor the sun gear 168. The one-way clutch 192 is connected between the input shaft I and the sun gear 168 (or in other words, the one-way clutch 192 is connected between the sun gears 168 and 176). The one-way clutch 196 is operable to prevent reverse rotation of the sun gear 184 of the output planetary gear set O. The one-way clutch 194 is connected between the one-way clutch 196 and the pinion carrier 172 and operable to prevent reverse rotation of the pinion carrier 172.

The operating sequence of four clutches 156, 158, 160, 162, two brakes 164, 166 and three one-way clutches 192, 194, 196 is tabulated in FIG. 15A. Gear ratio is calculated on the assumption that rho 1 ($\rho$1) is equal to 0.4, rho 2 ($\rho$2) is equal to 0.5 and rho 3 ($\rho$3) is equal to 0.4 where rho 1 denotes a ratio of number of teeth of the sun gear 168 to that of the ring gear 170 in the planetary gear set 150, rho 2 denotes a ratio of number of teeth of the sun gear 176 to the number of teeth of the ring gear 178 in the planetary gear set 152, and rho 3 denotes a ratio of number of teeth of the sun gear 184 to number of teeth of the ring gear 186 in the output planetary gear set 154.

Figure 16:
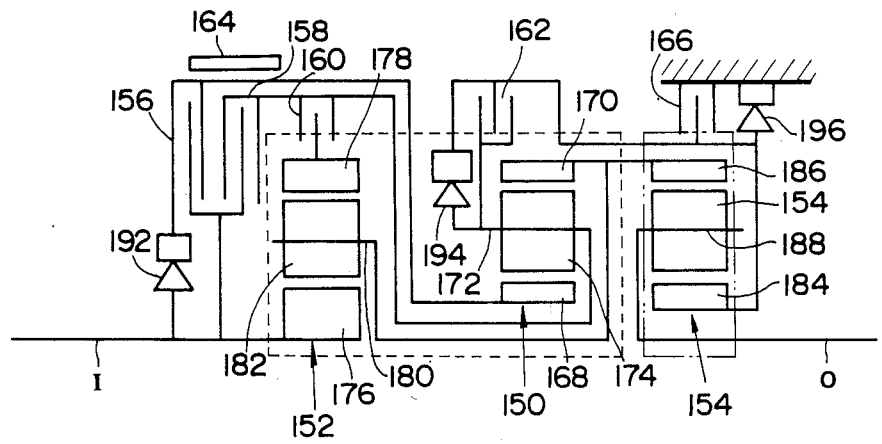

Referring to FIG. 16, a fifteenth embodiment is described. This fifteenth embodiment is substantially the same as the fourteenth embodiment shown in FIG. 15 but different from the latter in its arrangement of component parts. As shown in FIG. 16, a planetary gear set 150 is disposed between a planetary gear set 152 and an output planetary gear set 154.

Figure 17:
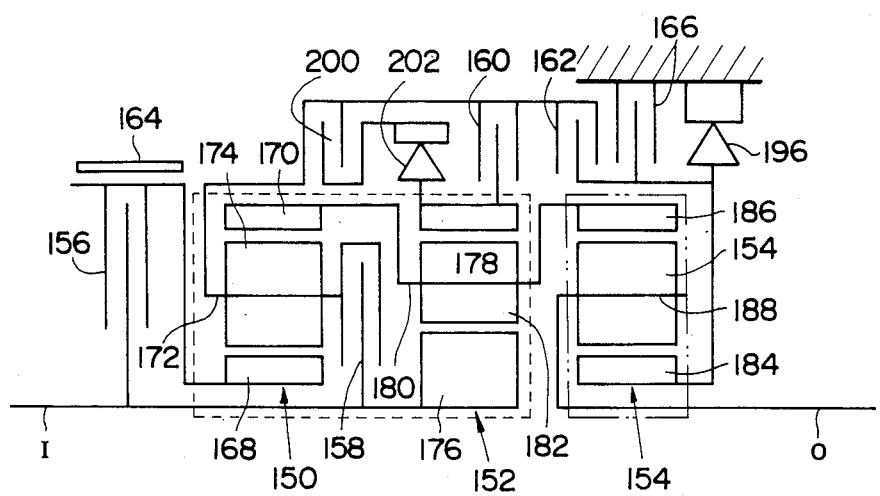

Referring to FIGS. 17 and 17A, a sixteenth embodiment is described. This sixteenth embodiment is substantially similar to the fourteenth embodiment shown in FIG. 15 except the following respects. Although in the embodiment shown in FIG. 15, the clutch 158 is disposed forwardly of the planetary gear set 150, this clutch 158 is disposed between the two planetary gear sets 150 and 152. Although, in the embodiment shown in FIG. 15, two one-way clutches 192 and 194 are provided, such clutches are not provided in this embodiment. In this embodiment shown in FIG. 17, in order to eliminate the need to engage a clutch 160 upon shifting in automatic drive range, a clutch 200 and a one-way clutch 202 are provided. As will be readily understood from FIG. 17A, the clutch 200 is kept engaged in automatic drive range. The operating sequence of clutches 156, 158, 200, 160, 162, two brakes 164, 166 and two one-way clutches 202, 196 is tabulated in FIG. 17A. The operation of the clutch 200 during operation with the fifth gear ratio has nothing to do with power transmission. This clutch 200 is engaged in order to prevent excessive rotation of the ring gear 178.

Although, in each of the embodiments shown in FIGS. 15 to 17, one-way clutches are used, these clutches are not essential elements of the present invention, and thus they may be taken away partly or all as the case may be.

Figure 18:
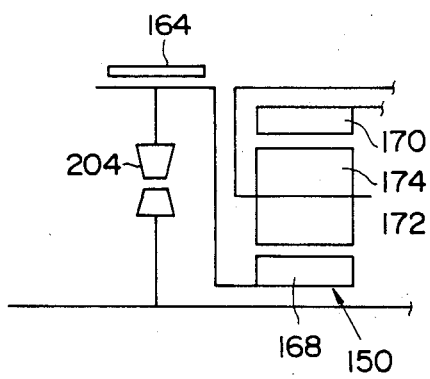

Referring to FIG. 18, a seventeenth embodiment is described. As shown in FIG. 18, a dog clutch 204 has replaced the clutch 158 disposed between the input shaft I and the sun gear 168 of the planetary gear set 150 in each of the embodiments shown in FIGS. 15 to 17. The provision of the dog clutch 204 enhances torque transmission effeciency during forward travel of an automobile.

Figure 19:
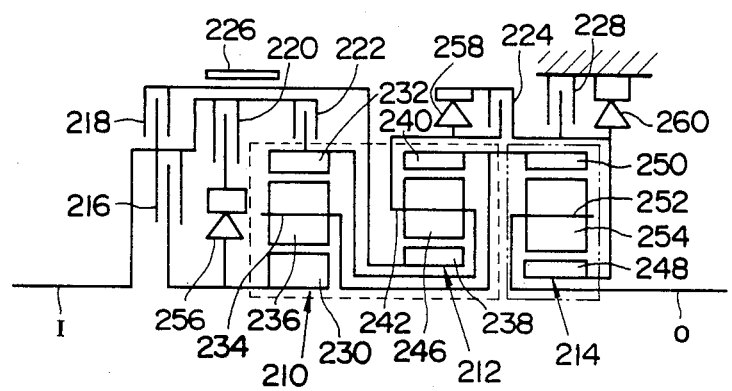

Referring to FIGS. 19 and 19A, an eighteenth embodiment is described. In this eighteenth embodiment, a planetary gear train comprises an input shaft I, an output shaft O, a basic planetary gearing including two simple planetary gear sets 210 and 212, an output planetary gear set 214 and a change speed arrangement including five clutches 216, 218, 220, 202 and 224, two brakes 226 and 228, and three one-way clutches 256, 258 and 260.

Planetary gear set 210 comprise a first sun gear 230, a first ring gear 232 (i.e., a rotary element which is to be held stationary when the first gear ratio and also when reverse is established), and a first pinion carrier 172 (i.e., a rotary element which serves as an output member of the basic planetary gearing of this particular embodiment) rotatably supporting a plurality of first pinions 236, each meshing with the sun gear 230 and the ring gear 232.

Planetary gear set 212 comprises a second sun gear 238, a second ring gear 240 constantly connected to the pinion carrier 234, and a second pinion carrier 234 constantly connected to the first ring gear 232 and rotatably supporting a plurality of second pinions 246, each meshing with the sun gear 238 and the ring gear 240.

Output planetary gear set 214 comprises a sun gear 248 constantly connectable via the clutch 224 to the second pinion carrier 242, a ring gear 250 constantly connected to the ring gear 24 to receive output from the basic planetary gearing, and a pinion carrier 252 rotatably supporting a plurality of pinions 254, each meshing with the sun gear 248 and the ring gear 250. The sun gear 248 is adapted to be braked or anchored by the brake 228. The pinion carrier 252 is constantly connected to the output shaft O.

The clutch 216 is operable to establish a connection between the input shaft I and the ring gear 232, the clutch 218 is operable to establish a connection between the input shaft I and the sun gear 238, the clutch 220 is operable to establish a connection between the input shaft I and the one-way clutch 256, and the clutch 222 is operable to establish a connection between the input shaft I and the ring gear 232. The brake 226 is operable to anchor the sun gear 238. The one-way clutch 256 is connected between the clutch 220 and the sun gear 230. The one-way clutch 260 is operable to prevent reverse rotation of the sun gear 248, and the one-way clutch 258 is connected between the one-way clutch 260 and the pinion carrier 242 to prevent reverse rotation of the pinion carrier 242.

The operating sequence of five clutches 216, 222, 224, 218, 220, two braks 226, 228 and three one-way clutches 256, 258, 260 is tabulated in FIG. 19A. Gear ratio is cauculated on the assumption that rho 1 ($p1$) is equal to 0.58, rho 2 ($p2$) is equal to 0.42 and rho 3 ($p3$) is equal to 0.42 where rho 1, rho 2 and rho 3 denote a ratio of the number of teeth of a sun gear to that of a ring gear in the planetary gear sets 210, 212 and 214, respectively.

Figure 20:
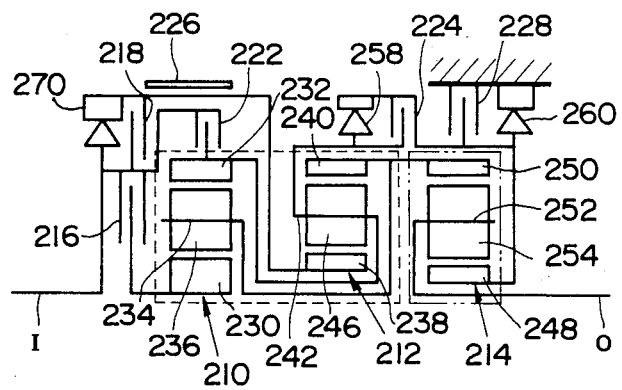

Referring to FIGS. 20 and 20A, a ninteenth embodiment is described. This embodiment is substantially similar to the embodiment shown in FIG. 19 except that the cluch 220 and one-way clutch 256 have been taken away and a new one-way clutch 270 has been provided which is connected between an input shaft and a sun gear 238 of a planetary gear set 212.

The operating sequence of clutches 216, 222, 224, 218, brakes 226, 228 and one-way clutches 270, 258, 260 is tabulated in FIG. 20A.

Any one or two or all of the one-way clutches used in each of the embodiments shown in FIGS. 19 and 20 may be taken away. Although a friction clutch is used as the clutch 216 in each of these embodiments, a dog clutch may be used instead of the friction clutch. The provision of the dog clutch improves torque transmission efficiency.

Figure 21:
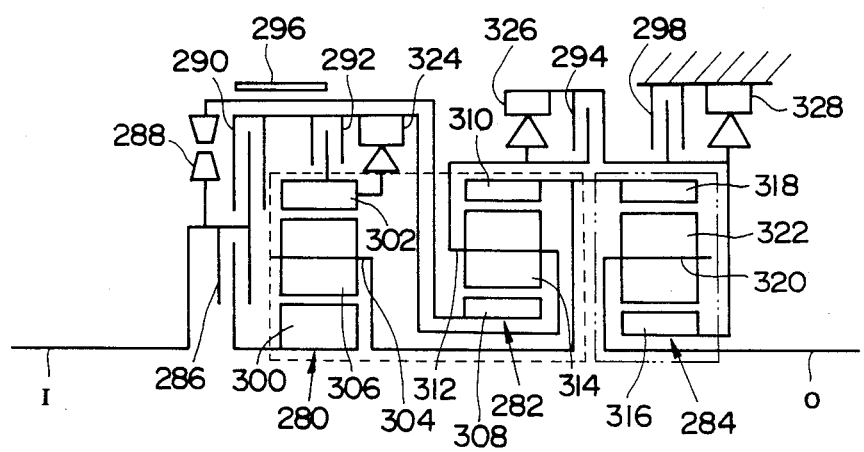

Referring to FIGS. 21 and 21A, a twentieth embodiment is described. In this embodiment, a planetary gear train comprises an input shaft I, an output shaft O, a basic planetary gearing including two simple planetary gear sets 280 and 282, an output planetary gear set 284, and a change speed arrangement including five clutches 286, 288, 290, 292, 294, two brakes 296, 298 and three one-way clutches 324, 326 and 328.

Planetary gear set 280 comprises a first sun gear 300, a first ring gear 302, and a first pinion carrier 304 (i.e., a rotary element which serves as an output member of the basic planetary gearing of this particular embodiment) rotatably supporting a plurality of first pinions 306, each meshing with the sun gear 300 and the ring gear 302.

Planetary gear set 282 comprises a second sun gear 308, a second ring gear 310 constantly connected to the pinion carrier 304, and a second pinion carrier 312 (i.e., a rotary element which is to be held stationary when the first gear ratio and also when reverse is established) rotatably supporting a plurality of second pinions 314, each meshing with the sun gear 308 and ring gear 310.

Output planetary gear set 284 comprises a set gear 316 connectable via the clutch 298 to the pinion carrier 312, a ring gear 318 constantly connected to the ring gear 310, and a pinion carrier 320 rotatably supporting a plurality of pinions 322, each meshing with the sun gear 316 and ring gear 318. The sun gear 316 is adapted to be anchored or braked by the brake 298. The pinion carrier 320 is constantly connected to the output shaft O.

The clutch 286 is operable to establish a connection between the input shaft I and the sun gear 300, the clutch 288 which is a dog clutch is operable to establish a connection between the input shaft I and the second sun gear 308, the clutch 290 is operable to establish a connection between the input shaft I and the pinion carrier 312, and the cluch 292 is operable to establish a connection between the ring gear 302 and the pinion carrier 312. The brake 296 is operable to anchor the sun gear 308. The one-way clutch 324 is connected between the ring gear 302 and the pinion carrier 312. The one-way clutch 328 is operable to prevent reverse rotation of the sun gear 316 and the one-way clutch 326 is connected between the one-way clutch 328 and the pinion carrier 312 to prevent reverse rotation of the pinion carrier 312.

The operating sequence of five clutches 286, 288 290, 292, 294, two brakes 296, 298 and three one-way clutches 324, 326, 328 is tabulated in FIG. 21A. Gear ratio is calculated on the assumption that rho 1 ($p1$) is equal to 0.55, rho 2 ($p2$) is equal to 0.44 and rho 3 ($p3$) is equal to 0.47 where rho 1, rho 2 and rho 3 denote a ratio of number of teeth of a sun gear to that of a ring gear in the planetary gear sets 280, 282 and 284, respectively.

Although in this embodiment, three one-way clutches are used, such clutches may be taken away partly or all.

It will now be understood from the description of various embodiments that a planetary gear train according to the present invention provides a reverse gear ratio and a first forward gear ratio which have a small difference in magnitude. More specifically, the reverse gear ratio is slightly smaller in magnitude than the forward first gear ratio.

What is claimed is:

1. A planetary gear train for an automatic transmission, said planetary gear train having a plurality of gear ratios including a first forward gear ratio and a reverse, said planetary gear train comprising:
   an input shaft;
   a basic planetary gearing including a first rotary element which is to be held stationary when the first gear ratio is established and also when the reverse is established, and a second rotary element which is to serve as an output member of said basic planetary gearing;
   an output planetary gear set including a ring gear, a sun gear and a pinion carrier, one of said ring gear and said sun gear of said output planetary gear set being constantly connected to said second rotary element of said basic planetary gearing;
   change speed means for establishing any desired one of the plurality of gear ratios, said change speed means including a clutch means for establishing a connection between the other one of said ring gear and said sun gear of said output planetary gear set and said first rotary element of said basic planetary gearing during operation with the first gear ratio and also during operation with the reverse, and a brake means for anchoring said the other one of said ring gear and said sun gear of said output planetary gear set during operation with the reverse; and
   an output shaft connected to said pinion carrier of said output planetary gear set.

2. A planetary gear train as claimed in claim 1, wherein said sun gear of said output planetary gear set is connectable via said clutch means to said first rotary element, and said ring gear is constantly connected to said second rotary element of said basic planetary gearing.

3. A planetary gear train as claimed in claim 2, wherein
   said basic planetary gearing comprises: a first planetary gear set including a first sun gear, a first pinion carrier serving as said second rotary element and constantly connected to said ring gear of said output planetary gear set and a first ring gear; and a second planetary gear set including a second sun gear constantly connected to said first sun gear, a second pinion carrier serving as said first rotary element and thus connectable via said clutch means to said sun gear of said output planetary gear set, and a second ring gear constantly connected to said first pinion carrier and also to said ring gear of said output planetary gear set;
   said change speed means includes a second clutch means for establishing a connection between said input shaft and said first ring gear, a third clutch means for establishing a connection between said input shaft and said first and second sun gears, and a second brake means for anchoring said first and second sun gears.

4. A planetary gear train as claimed in claim 3, wherein
   said change speed means includes a first one-way clutch means for preventing reverse rotation of said sun gear of said output planetary gear set, and a second one-way clutch means for preventing reverse rotation of said second pinion carrier of said second planetary gear set.

5. A planetary gear train as claimed in claim 2, wherein
   said basic planetary gearing comprises: a first planetary gear set including a first sun gear, a pinion carrier serving as said second rotary element and constantly connected to said ring gear of said output planetary gear set and a first ring gear; and a second planetary gear set having a second sun gear, a second pinion carrier serving as said first rotary element and thus connectable via said clutch means to said sun gear of said output planetary gear set, and a second ring gear constantly connected to said first pinion carrier and also to said ring gear of said output planetary gear set;
   said change speed means includes a second clutch means for establishing a connection between an input shaft and said first ring gear, a third clutch means for establishing a connection between said input shaft and said first sun gear, a fourth clutch means for establishing a connection between said first sun gear and said second sun gear, a fifth clutch means for establishing a connection between said first sun gear and said second pinion carrier, and a second brake means for anchoring said second sun gear.

6. A planetary gear train as claimed in claim 5, wherein
   said change speed means includes a first one-way clutch means for preventing reverse rotation of said sun gear of said output planetary gear set, a second one-way clutch means for preventing reverse rotation of said second pinion carrier of said second planetary gear set, and a third one-way clutch drivingly connected between said first sun gear and said second sun gear of said first and second planetary gear sets, respectively.

7. A planetary gear train as claimed in claim 2, wherein
   said basic planetary gearing comrises: a dual-intermeshed pinion planetary gear set including a ring gear serving as said second rotary element and thus constantly connected to said ring gear of said output planetary gear set, a pinion carrier rotatably supporting at least one first pinion meshing with said ring gear and a second pinion meshing with said first pinion, a first sun gear meshing with said first pinion, and a second sun gear meshing with said second pinion, said pinion carrier of said dual-intermeshed pinion planetary gear set serving as said first rotary element and thus connectable via said clutch means to said sun gear of said output planetary gear set;
   said change speed means includes a second clutch means for establishing a connection between said input shaft and said second sun gear, a third clutch means for establishing a connection between said input shaft and said first sun gear, and a second brake means for anchoring said first sun gear of said compound planetary gear set.

8. A planetary gear train as claimed in claim 7, wherein
said change speed means includes a one-way clutch means for preventing reverse rotation of said sun gear of said output planetary gear set.

9. A planetary gear train as claimed in claim 7, wherein
said change speed means includes a fourth clutch means for establishing a connection between said input shaft and said pinion carrier of said dual-intermeshed pinion planetary gear set.

10. A planetary gear set as claimed in claim 9, wherein
said change speed means includes a one-way clutch means for preventing reverse rotation of said sun gear of said output planetary gear set, and a second one-way clutch means for preventing reverse rotation of said pinion carrier of said dual-intermeshed pinion planetary gear set.

11. A planetary gear train as claimed in claim 10, having a torque converter operatively disposed between said input shaft and said second clutch means, including a pump impeller constantly connected to said input shaft and a turbine runner constantly connected to said second clutch means, and wherein said second one-way clutch means is connected in series with said first one-way brake means.

12. A planetary gear train as claimed in claim 1, wherein said ring gear of said output planetary gear set is connectable via said clutch means to said first rotary element of said basic planetary gearing, and said sun gear of said output planetary gear set is constantly connected to said second rotary element of said basic planetary gearing.

13. A planetary gear train as claimed in claim 12, wherein
said basic planetary gearing comprises: a first planetary gear set including a first sun gear, a first pinion carrier serving as said second rotary element and constantly connected to said sun gear of said output planetary gear set and a first ring gear; and a second planetary gear set having a second sun gear, a second pinion carrier serving as said first rotary element and thus connectable via said clutch means to said ring gear of said output planetary gear set, and a second ring gear constantly connected to said first pinion carrier and also to said sun gear of said output planetary gear set;
said change speed means includes a second clutch means for establishing a connection between said input shaft and said first ring gear, a third clutch means for establishing a connection between said input shaft and said first sun gear, a fourth clutch means for establishing a connection between said first sun gear and said second sun gear, a fifth clutch means for establishing a connection between said first sun gear and said second pinion carrier, and a second brake means for anchoring said second sun gear.

14. A planetary gear train as claimed in claim 13, wherein
said change speed means includes a sixth clutch means for establishing a connection between said sun gear of said output planetary gear set and said pinion carrier of said output planetary gear set.

15. A planetary gear train as claimed in claim 13, wherein
said change speed means includes a first one-way clutch means for preventing reverse rotation of said ring gear of said output planetary gear set, a second one-way clutch means for preventing reverse rotation of said second pinion carrier of said second planetary gear set, and a third one-way clutch means drivingly connected between said first sun gear and said second sun gear of said first and second planetary gear sets, respectively.

16. A planetary gear train as claimed in claim 13, wherein
said change speed means includes a first one-way clutch means for preventing rotation of said ring gear of said output planetary gear set, a second one-way clutch means for preventing reverse rotation of said second pinion carrier of said second planetary gear set, a thrid one-way clutch means drivingly connected between said first sun gear and said second sun gear of said first and second planetary gear sets, respectively, and a sixth clutch means for establishing a connection between said sun gear of said output planetary gear set and said ring gear of said output planetary gear set.

* * * * *